(12) United States Patent
Majmundar et al.

(10) Patent No.: US 11,082,329 B2
(45) Date of Patent: Aug. 3, 2021

(54) LOSSLESS DATA DELIVERY AT ROUTE CHANGES IN WIRELESS RADIO NETWORKS

(71) Applicant: AT&T Intellectual Property I, L.P., Atlanta, GA (US)

(72) Inventors: Milap Majmundar, Justin, TX (US); Thomas Novlan, Justin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 594 days.

(21) Appl. No.: 15/994,453

(22) Filed: May 31, 2018

(65) Prior Publication Data

US 2019/0372887 A1     Dec. 5, 2019

(51) Int. Cl.
| | |
|---|---|
| *H04L 12/707* | (2013.01) |
| *H04L 12/801* | (2013.01) |
| *H04L 12/703* | (2013.01) |
| *H04L 12/26* | (2006.01) |
| *H04L 1/18* | (2006.01) |

(52) U.S. Cl.
CPC .......... *H04L 45/22* (2013.01); *H04L 43/0829* (2013.01); *H04L 45/28* (2013.01); *H04L 47/34* (2013.01); *H04L 1/1825* (2013.01)

(58) Field of Classification Search
CPC ...... H04L 45/22; H04L 45/28; H04L 41/0654
See application file for complete search history.

(56) References Cited

U.S. PATENT DOCUMENTS

| | | |
|---|---|---|
| 7,453,864 B2 | 11/2008 | Kennedy et al. |
| 7,551,562 B2 | 6/2009 | Srikrishna et al. |
| 7,969,889 B2 | 6/2011 | Vaswani et al. |
| 8,036,224 B2 | 10/2011 | Axelsson et al. |
| 8,208,368 B2 | 6/2012 | Holliday |
| 8,214,707 B2 | 7/2012 | Munson et al. |
| 8,451,795 B2 | 5/2013 | Ho et al. |

(Continued)

FOREIGN PATENT DOCUMENTS

| | | |
|---|---|---|
| WO | 2009109076 A1 | 9/2009 |
| WO | 2015152511 A1 | 10/2015 |

OTHER PUBLICATIONS

3GPP TSG-RAN WG2 Meeting 102 #102; Consideration of routing design for IAB (Year: 2018).*

(Continued)

*Primary Examiner* — Charles C Jiang
*Assistant Examiner* — Voster Preval
(74) *Attorney, Agent, or Firm* — Amin, Turocy & Watson, LLP

(57) ABSTRACT

The described technology is generally directed towards lossless delivery of data when there are route changes, e.g., in an integrated access and backhaul (IAB) multi-hop relay network. When a route changes is to occur, the last unchanged node in a multiple hop route preserves the data (e.g., copies unacknowledged and unsent PDCP PDUs from the protocol stack corresponding to the radio link control layer of the failed relay hop, and populates a replacement protocol stack for the node in the new route with the preserved data. Also described is pre-emptive detection of link failure, which triggers a route change based on monitoring retransmissions to detect a deteriorating link, which can occur before complete link communication failure.

20 Claims, 10 Drawing Sheets

(56) References Cited

U.S. PATENT DOCUMENTS

| | | | |
|---|---|---|---|
| 8,654,627 | B2 | 2/2014 | Datz et al. |
| 8,693,322 | B2 | 4/2014 | Zhang |
| 8,724,493 | B2 | 5/2014 | Schoeller et al. |
| 8,824,471 | B2 | 9/2014 | Hui et al. |
| 9,538,416 | B2 | 1/2017 | Van et al. |
| 9,706,418 | B2 | 7/2017 | Decarreau et al. |
| 9,887,809 | B2 | 2/2018 | Yi et al. |
| 2006/0023632 | A1 | 2/2006 | Ozer et al. |
| 2006/0285505 | A1 | 12/2006 | Cho et al. |
| 2010/0118781 | A1 | 5/2010 | Petrovic |
| 2010/0322141 | A1 | 12/2010 | Liu et al. |
| 2013/0163407 | A1 | 6/2013 | Sinha et al. |
| 2015/0133122 | A1 | 5/2015 | Chen |
| 2016/0014020 | A1* | 1/2016 | Kafle .................. H04W 76/15 370/228 |
| 2016/0057800 | A1* | 2/2016 | Ingale .................. H04W 76/18 370/216 |
| 2016/0182276 | A1* | 6/2016 | Wu ...................... H04W 76/19 370/225 |
| 2017/0005913 | A1 | 1/2017 | Hampel et al. |
| 2017/0006499 | A1* | 1/2017 | Hampel .................. H04L 69/40 |
| 2017/0055283 | A1* | 2/2017 | Shrivastava .......... H04W 76/15 |
| 2018/0092139 | A1 | 3/2018 | Novlan et al. |
| 2018/0317156 | A1* | 11/2018 | Bergstrom ............. H04L 47/26 |
| 2019/0082363 | A1* | 3/2019 | Park ...................... H04W 76/18 |
| 2019/0098520 | A1* | 3/2019 | Kim ...................... H04W 76/28 |
| 2019/0253945 | A1* | 8/2019 | Paladugu .............. H04W 76/27 |
| 2020/0029384 | A1* | 1/2020 | Hong .................... H04W 40/22 |
| 2020/0196387 | A1* | 6/2020 | Roy ........................ H04W 4/80 |
| 2020/0287615 | A1* | 9/2020 | Zhu ....................... H04W 28/06 |
| 2020/0337102 | A1* | 10/2020 | Wang .................. H04W 36/305 |

OTHER PUBLICATIONS

AT&T, et al., "Study on Integrated Access and Backhaul for NR," 8881123GPP TSG RAN Meeting #75 RP-170821 Dubrovnik, Croatia, Mar. 6-9, 2017, 5 pages.

Biswas, et al., "ExOR: opportunistic multi-hop routing for wireless networks." ACM SIGCOMM Computer Communication Review 35.4 (2005): 133-144.

Kim, et al., "On accurate measurement of link quality inmulti-hop wireless mesh networks." Proceedings of the 12th annual international conference on Mobile computing and networking, ACM, 2006, 12 pages.

Tsai, et al., "Link-quality aware ad hoc on-demand distance vector routing protocol." Wireless Pervasive Computing, 2006 1st International Symposium, IEEE, 2006, 7 pages.

Kulkarni, et al., "How Many Hops Can Self-Backhauled Millimeter Wave Cellular Networks Support?." arXiv preprint arXiv:1805. 01040 (2018), 15 pages.

Xu, et al., "Improved Fast Centralized Retransmission Scheme for High-Layer Functional Split in 5G Network." Journal of Physics: Conference Series, vol. 960, No. 1, IOP Publishing, 2018, 11 pages.

\* cited by examiner though several components are shown in the figure, and may be described herein.

LOSSLESS DATA DELIVERY AT ROUTE CHANGES IN WIRELESS RADIO NETWORKS

TECHNICAL FIELD

The subject application is related to wireless communication systems, and, for example, to lossless delivery of data when there are dynamic route changes in an integrated access and backhaul multiple hop relay network.

BACKGROUND

In new radio, sometimes referred to as 5G, wireless communication systems, a data relaying solution has been identified, in which user access and backhaul links are integrated with each other seamlessly using the same air interface. This is generally referred to as Integrated Access and Backhaul (IAB), which makes it possible to dynamically share air interface resources between user access and backhaul links such as in response to traffic and network conditions.

With an IAB multiple hop (multi-hop) network, there can be a dynamic route change, such as when channel or network conditions cause an IAB link to fail and a replacement link is configured and used. However, a route change over the IAB network has a potential for data loss. For example, a route change could cause already acknowledged communications to be dropped without any possibility of recovery.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
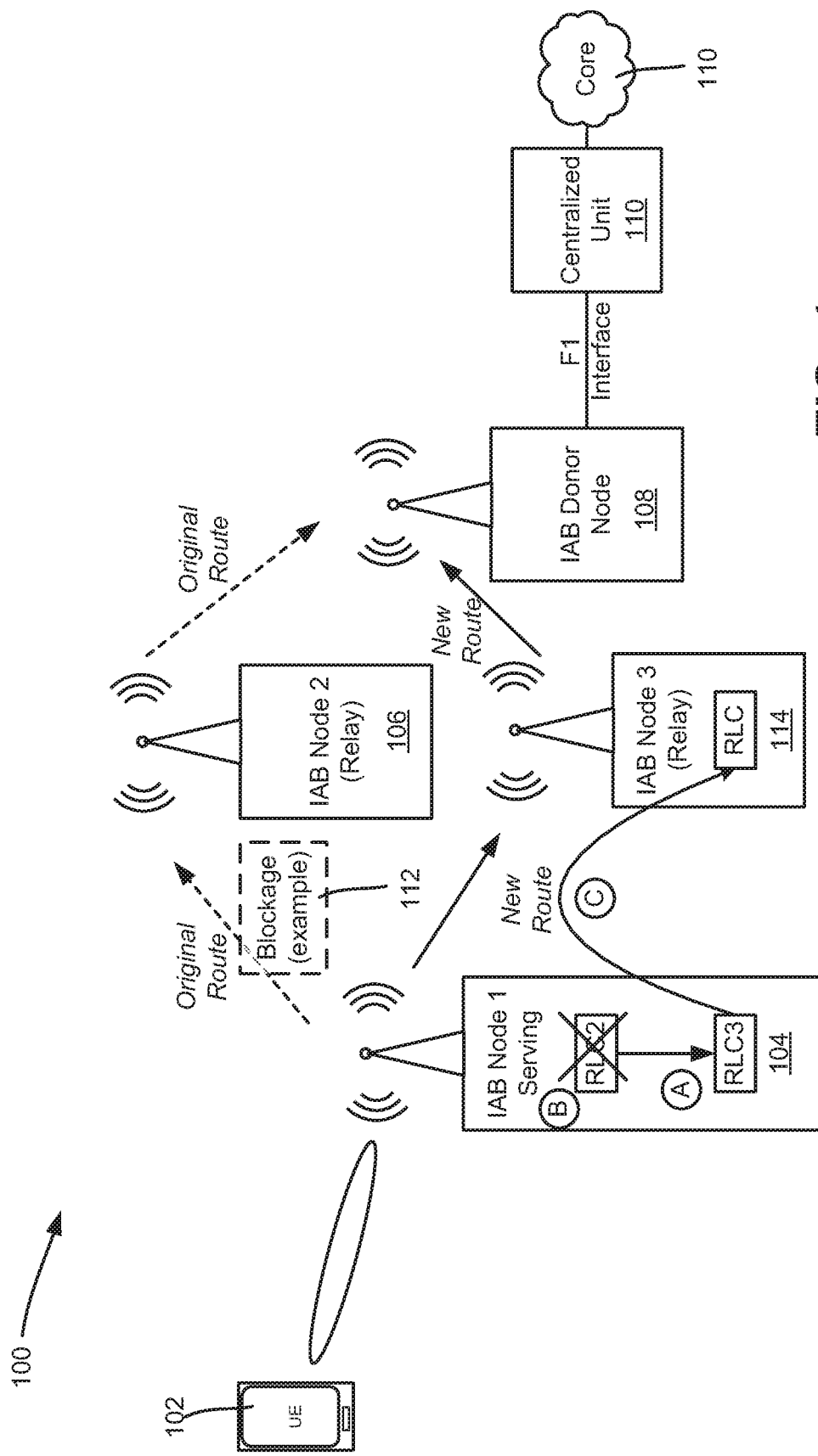
FIG. 1 illustrates an example wireless communication system in which data delivery is lossless when a route change occurs over an Integrated Access and Backhaul (IAB) network, in accordance with various aspects and implementations of the subject disclosure.

One or more aspects of the technology described herein are generally directed towards lossless delivery of data when there are route changes in a multi-hop relay network. The technology is based on having the last unchanged node in a multiple hop route preserve the data (e.g., copy unacknowledged and unsent packet data convergence protocol protocol data unit data (PDCP PDUs) data) from the protocol stack corresponding to the radio link control layer of the failed relay hop, and populate a replacement protocol stack for the node in the new route with the preserved data. In one or more implementations, the copied PDCP PDUs are transmitted first to the new IAB node, before any new data that is received from an incoming link. This provides a data recovery mechanism that recovers partially transmitted or untransmitted PDCP PDUs when a route change occurs.

In one or more aspects, a pre-emptive detection of link failure is performed, which triggers a route change. To this end, radio link control retransmissions are monitored, and if too many retransmissions occur (e.g., at a high rate or level), which indicates a deteriorating next hop link, a route change is triggered. This pre-emptive detection prevents a link from deteriorating beyond a certain point, and thus can add robustness to the dynamic multi-hop IAB network by taking preventive action to change the route.

It should be understood that any of the examples and terms used herein are non-limiting. For instance, the examples are based on New Radio (NR, sometimes referred to as 5G) communications between a user equipment exemplified as a smartphone or the like and network devices/nodes; however virtually any communications devices may benefit from the technology described herein, and/or their use in different spectrums may likewise benefit. Notwithstanding, these are non-limiting examples, and any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device" or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled).

Figure 2:
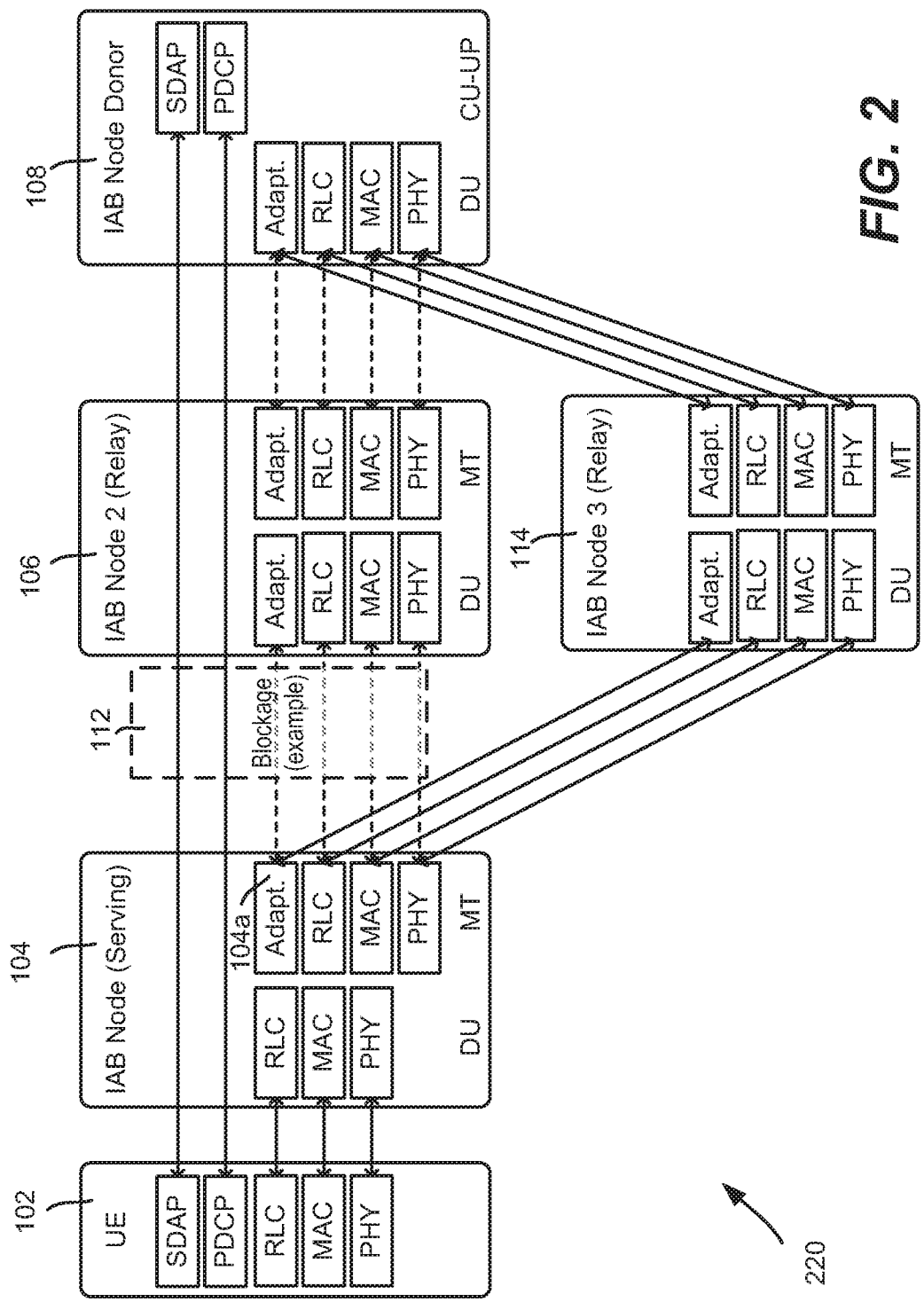
FIG. 2 illustrates an example user plane protocol stack for multi-hop IAB relay scenario, in which data delivery is lossless when a route change occurs in accordance with various aspects and implementations of the subject disclosure.

FIG. 1 illustrates a wireless communication system comprising and IAB network 100, in which a user equipment (UE) 102 communicates with an IAB (serving) node 1 (labeled 104). As is specified in an IAB network such as the network 100, IAB nodes relay information on behalf of a user equipment to (uplink) and from (downlink) a donor node. In general, a relay node can multiplex access and backhaul links in time, frequency, or space (e.g. beam-based operation). In the example of FIG. 2, a route for relaying data is from IAB node 1 (104) to IAB node 2 (labeled 106) to a donor node 108.

Note that 5G mobile networks are deployed using a split RAN (radio access network) protocol architecture such that on the user plane the PDCP (packet data convergence protocol) sublayers reside at a centralized unit (CU) 110, while the RLC (radio link control), MAC (medium access control) and PHY (physical) layers reside at the distributed unit (DU), which is the IAB donor node 108 in FIG. 2. User plane data is carried on Data Radio Bearers (DRBs) that traverse the user plane RAN protocol architecture. On the control plane, signaling radio bearers (SRBs) are set up that carry control messages from the RRC (radio resource control) layer and also utilize the PDCP layer at the CU, and are further carried down through the RLC, MAC, and PHY layers at the DU to be delivered to the UE over the air interface. Each network user can be allocated multiple DRBs and SRBs by the network. The network interface between the CU and DU is called the µl interface (per 3GPP specifications).

Consider that the original route (represented by the dashed arrows in FIG. 1) is degraded to an extent that a new route is desired. An example reprinted in FIG. 1 is a blockage, e.g., a large vehicle has blocked the communication path between node 104 and the node 106, which can happen with communication in the millimeter wave spectrum used by 5G. Note that as described herein, the route need not entirely fail, but can be detected as being sufficiently degraded to warrant a route change.

As described herein, when a route change is needed, a new node replaces the old (e.g., degraded or failed) node, forming a new route. In FIG. 1, this is represented by the IAB node 3 (labeled 114) being used in a new route instead of the degraded or failed node 2 (106).

A problem with rerouting solutions is that there is a potential for data loss. For example, when channel or network conditions cause an JAB link to fail, a route change could cause already acknowledged PDCP PDUs (protocol data units) to be dropped without any possibility of recovery. This prevents lossless delivery of data across the JAB network when there are route changes.

As a more particular example, an issue is that the acknowledgement (ACK) for a PDCP PDU transmitted on the access link from the UE to first access JAB node is provided to the UE well before the PDCP PDU has eventually reached its final destination (the JAB donor node 108 in the case of an uplink example) in the multi-hop relay network. In this scenario, if there is a link failure on one of the relay hops, the RLC at the UE may have already have discarded the PDCP PDU. This may cause a loss in data without some form of data recovery to recover partially transmitted or untransmitted PDCP PDUs when this route change happens.

Described herein is data recovery at a route change to ensure lossless data delivery in an JAB network that performs dynamic route changes. In general and as described herein, the last unchanged JAB node (the node 104 in FIG. 1) copies data from the old route's RLC (state machine) in the protocol stack, e.g., RLC2 into the new route's RLC (state machine) in the new route's protocol stack, e.g., RLC3 in FIG. 1, as represented via the arrow labeled A in the node 104. Once this information is copied, the old protocol stack can be reset (arrow B), and transmitted in the new route, e.g., to the relay node 114 in FIG. 1 (as represented via the arrow labeled C between the node 104 and the node 114).

FIG. 2 shows a user plane protocol stack for a multi-hop JAB relay scenario 220 corresponding to FIG. 1. Note that in the example protocol stack the full RLC layer, including the ARQ (automatic repeat request) functionality resides at each JAB node. Hence, the RLC ARQ in this multi-hop relay network is performed on a hop-by-hop basis. Again the blockage example 112 in the uplink scenario has caused a rerouting from the IAB node 1 (serving) 104 to the IAB node 114 in place of the old, degraded-communication node 106.

In one or more implementations and as represented in FIG. 2, in 5G New Radio, an adaptation layer ("Adapt.") can be placed above the RLC layer at the IAB nodes. The adaptation layer may perform the tasks of routing of UE traffic across the multi-hop network, and performing an aggregation of bearers from multiple UE into common backhaul bearers. In FIG. 2, the adaption layer of the IAB node 104 is labeled as 104a.

Described herein is data recovery along with pre-emptive detection of link failure, resulting in triggering a route change in a way that performs data recovery in conjunction with the route change to ensure lossless data delivery in a IAB network with dynamic route changes. Although in one or more implementations some of the logic and operations are performed by the adaptation layer, alternative implementations can employ other components for this purpose.

Figure 3:
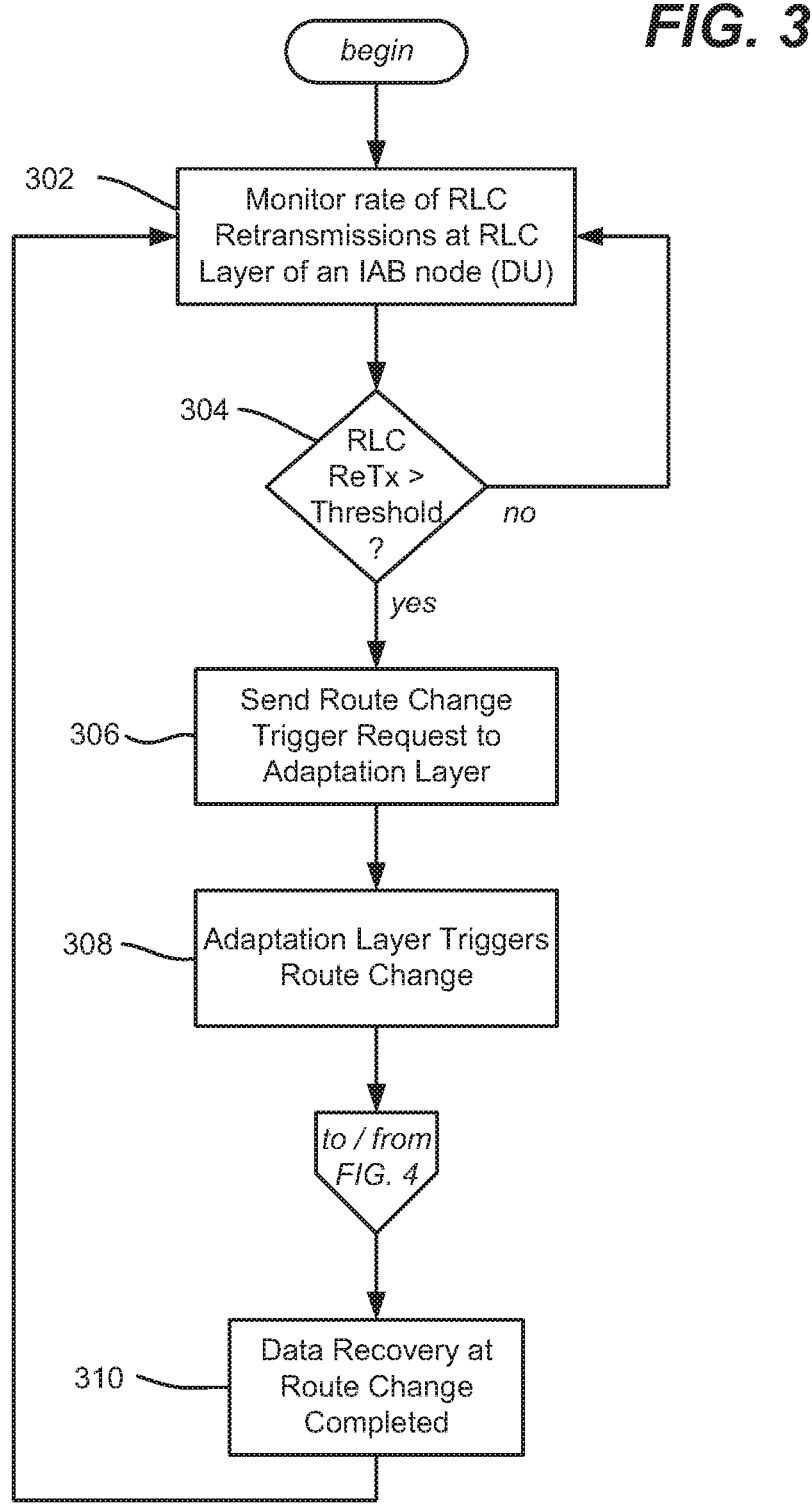
FIGS. 3 and 4 comprise a flow diagram comprising example operations directed towards lossless data delivery in an IAB network with a dynamic route change, in accordance with various aspects and implementations of the subject disclosure.
Figure 4:
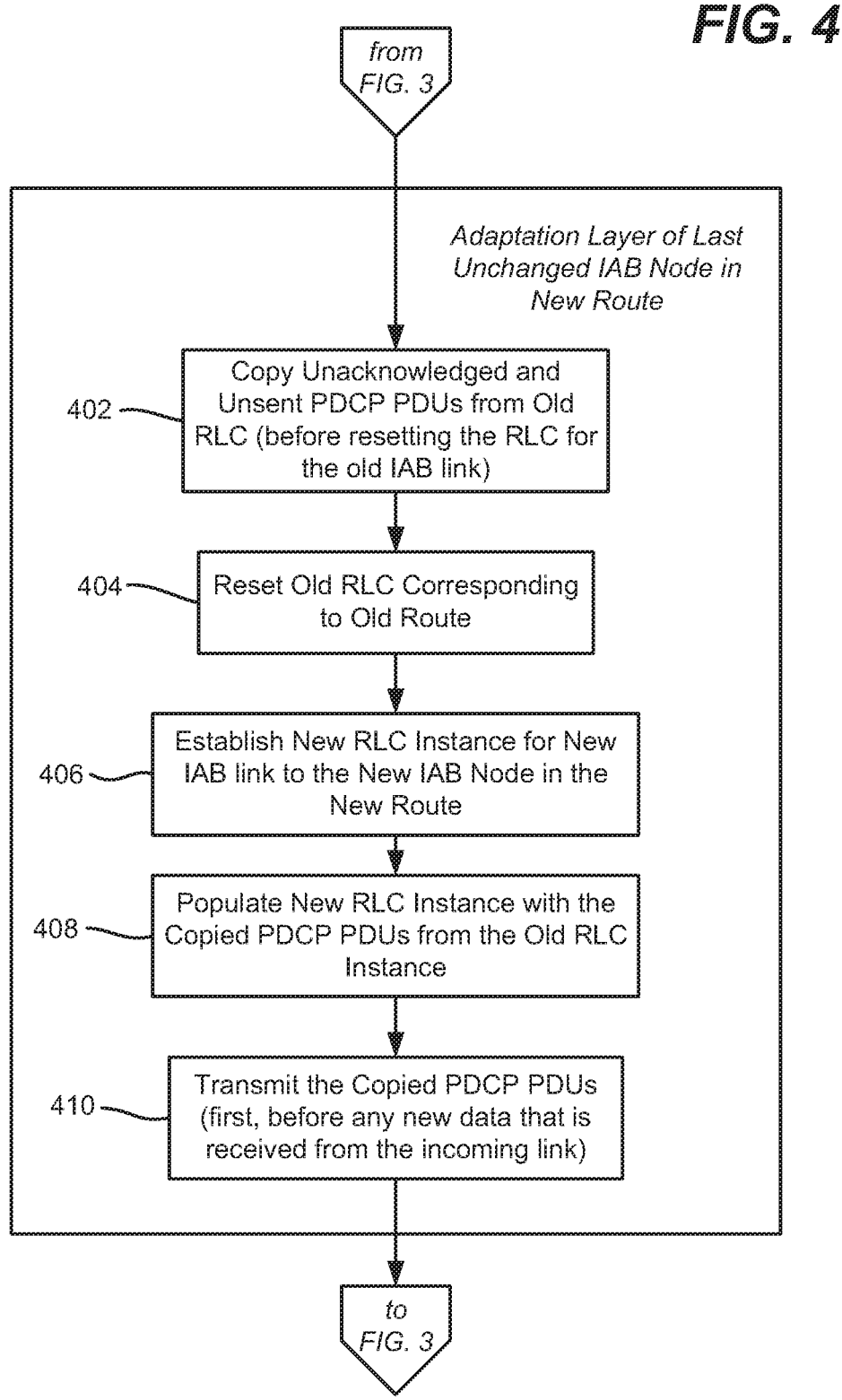

FIGS. 3 and 4 comprise a flow diagram having example operations directed towards detection of a link failure to trigger a route change, as well as data recovery operations. Note that for hop-by-hop RLC ARQ, the transmitting RLC at an IAB node can monitor the level/rate of RLC retransmissions over the next hop, as represented by operation 302. When the next hop link deteriorates beyond a certain point (when level of RLC retransmissions crosses a certain threshold) as evaluated at operation 304, the RLC layer sends a message (a route change trigger request) as represented by operation 306 to the adaptation layer above the RCL layer in the IAB node's protocol stack (or a similarly configured component) to trigger a route change. The adaption layer (or the similarly configured component) finds a new node for the route, e.g., by finding an alternative route or switching to an already established back-up route, so as to bypass the hop with the deteriorating link, as represented by operation 308.

Note that the preemptive rerouting before an actual link failure can add robustness to the dynamic multi-hop IAB network. Notwithstanding, the data recovery technology described herein can be used with other link failure detection mechanisms, such as to trigger a route change upon a complete link failure (instead of or in addition to preemptive detection).

With respect to data recovery at such a route change, as described herein, when a route change is triggered in response to a link failure on one of the multi-hop links, a loss in data can occur, without some form of data recovery mechanism to recover partially transmitted or untransmitted PDCP PDUs when the route change occurs. To prevent such data loss, according to the technology described herein, the example operations described with reference to FIG. 4 can be performed.

To this end, in one or more implementations, when the route change is triggered, the adaptation layer 104*a* at the last unchanged IAB node in the new route (e.g., the node 104 in FIGS. 1 and 2) copies the unacknowledged and unsent PDCP PDUs from the "old" (still current in the last unchanged IAB node in the route) RLC, as represented by operation 402 of FIG. 4. Note that additional information can be copied from the RLC as well, but for purposes of data recovery as described herein at least the unacknowledged and unsent PDCP PDUs.

At this time, with the information from the old RCL preserved, the adaption layer 104*a* can safely reset the old RLC corresponding to old route, as represented by operation 404. Note that the entire protocol stack below the adaptation layer can be reset.

Operation 406 represents the adaption layer 104*a* resetting establishing a new RLC instance (and if needed a new MAC and PHY instance) for the new IAB link to the new IAB node in the new route, e.g., the node 114 in FIGS. 1 and 2. Once established, operation 408 populates the new RLC instance with the copied PDCP PDUs from the old RLC instance, (copied at operation 402 in this example).

Operation 410 represents transmitting the copied PDCP PDUs to the new node (e.g., the node 114) in the new route, before any new data that is received from the incoming link, (that is, from the user equipment in FIGS. 1 and 2). Operation 410 then returns to operation 310 of FIG. 3, where the data recovery at the route change is completed, and new data can be communicated.

Note that because the last unchanged IAB node in a route (e.g., the node 104 in FIGS. 1 and 2) has the information needed to retransmit the unacknowledged or untransmitted PDCP PDUs, the last unchanged IAB node can internally take the above actions in order to perform data recovery. This is efficient because operations are within the node; moreover, because for these operations communication with other nodes is not needed, data recovery is without the risk of further loss that could occur with the exchange of data packets on additional links.

Figure 5:
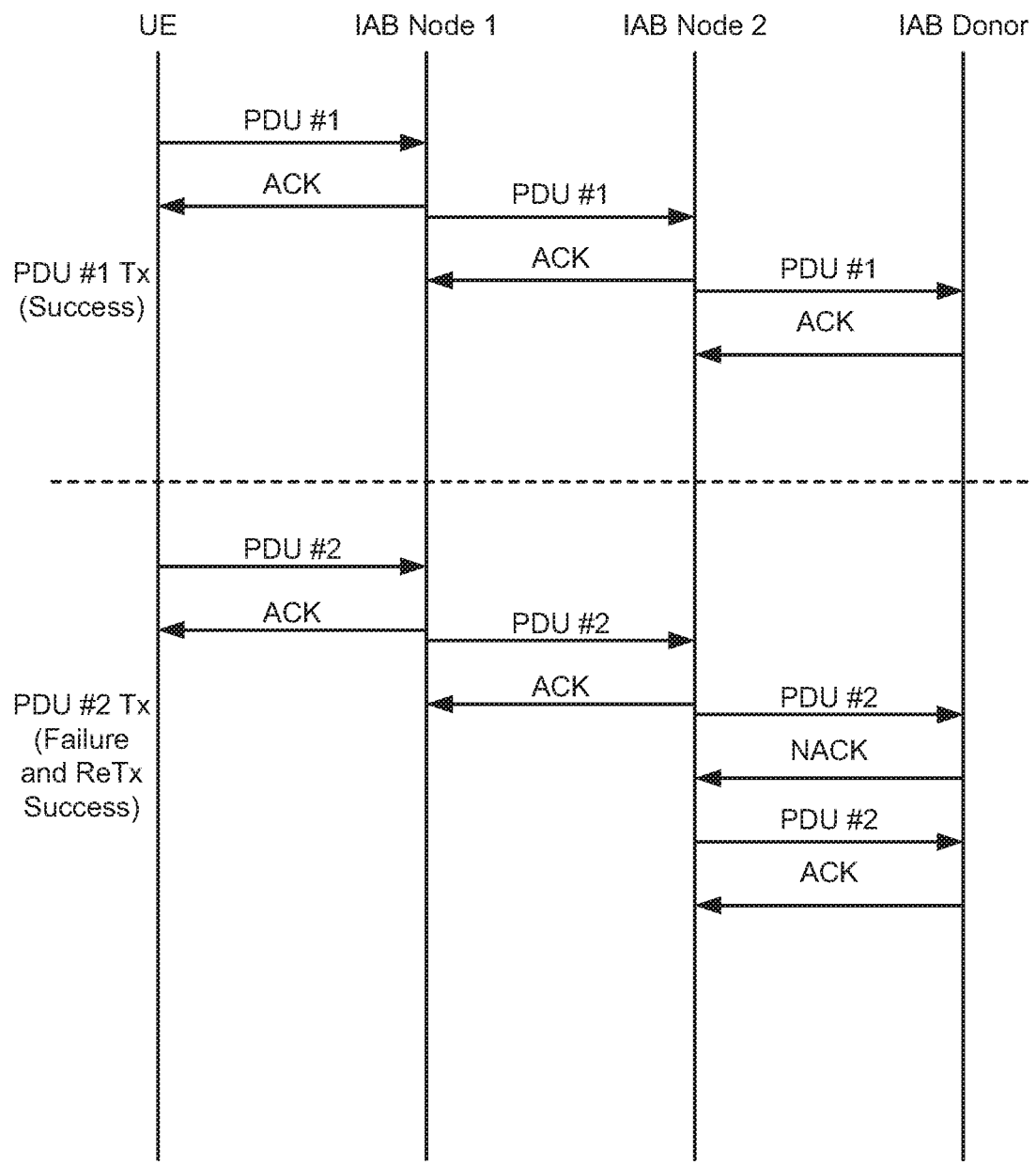
FIG. 5 is a data flow diagram showing data transmissions and ACK/NACK responses that facilitate lossless data delivery in an IAB network with a dynamic route change, in accordance with various aspects and implementations of the subject disclosure.

By way of example, FIG. 5 shows a data flow when the relay link between IAB node 1 (104) and IAB node 2 (106) fails, and a route change is triggered. In this example, the partially transmitted/unacknowledged RLC PDUs at IAB node 1 (104) may need to be retransmitted over the new route. If the new route is still via IAB node 1, then IAB node 1 (104) is able to retransmit the partially transmitted/unacknowledged PDUs via the new link.

Figure 6:
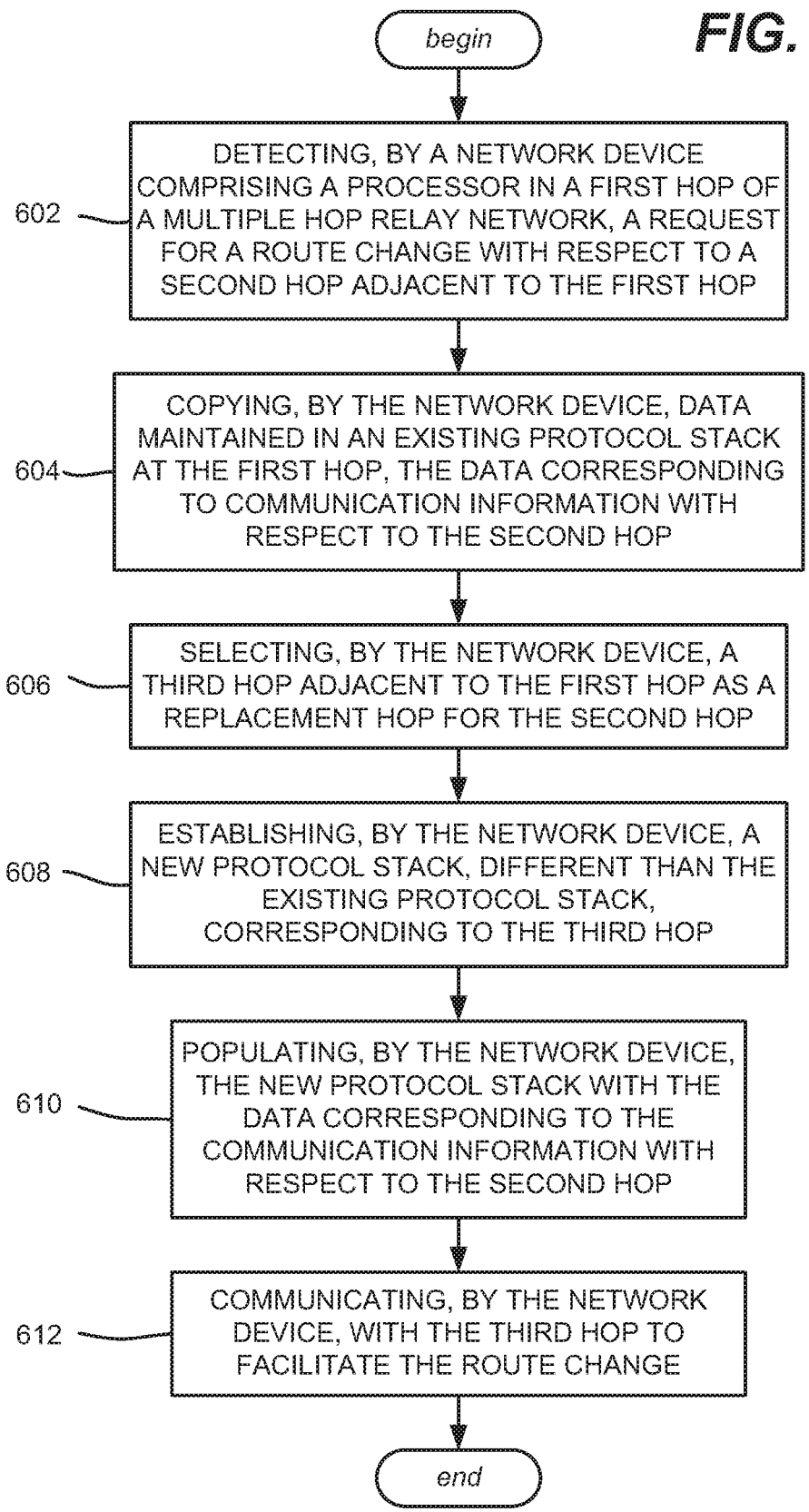
FIG. 6 illustrates an example flow diagram of network device operations with respect to lossless data delivery in an IAB network with a dynamic route change, in accordance with various aspects and implementations of the subject disclosure.

FIG. 6 summarizes some of the example operations described herein with respect to data recovery. Operation 602 represents detecting, by a network device comprising a processor in a first hop of a multiple hop relay network, a request for a route change with respect to a second hop adjacent to the first hop. Operation 604 represents copying, by the network device, data maintained in an existing protocol stack at the first hop, the data corresponding to communication information with respect to the second hop. Operation 606 represents selecting, by the network device, a third hop adjacent to the first hop as a replacement hop for the second hop. Operation 608 represents establishing, by the network device, a new protocol stack, different than the existing protocol stack, corresponding to the third hop. Operation 610 represents populating, by the network device, the new protocol stack with the data corresponding to the communication information with respect to the second hop. Operation 612 represents communicating, by the network device, with the third hop to facilitate the route change.

Copying the data maintained in the existing protocol stack can comprise copying the data from a radio link control layer of the existing protocol stack, and populating the new protocol stack with the data can comprise populating a radio link control layer of the new protocol stack. Aspects can comprise resetting, by the network device, the radio link control layer of the existing protocol stack after the copying the data maintained in the radio link control layer of the existing protocol stack.

Copying the data maintained in the existing protocol stack can comprise copying packet data convergence protocol protocol data unit (PDCP PDU) data from a radio link control layer of the existing protocol stack, and populating the new protocol stack can comprise populating a radio link control layer of the new protocol stack with a copy of the PDCP PDU data.

Copying the data maintained in the existing protocol stack can comprise copying unacknowledged and unsent PDCP PDU data from a radio link control layer of the existing protocol stack, and wherein the populating the new protocol stack can comprise populating a radio link control layer of the new protocol stack with a copy of the unacknowledged and unsent PDCP PDU data. Communicating with the third hop to perform the route change can comprise transmitting the unacknowledged and unsent PDCP PDU protocol data unit data to the third hop before transmitting other data that is received from an incoming link to the third hop node.

Detecting the request for the route change can comprise determining a deterioration of a radio link between the first hop and the second hop. Detecting the request for the route change can comprise monitoring control retransmission data of a radio link corresponding to communications between the first hop and the second hop, and determining a deterioration of the radio link when the retransmission data has reached a threshold value. Detecting the request for the route change can comprise monitoring radio link control retransmission data corresponding to communications between the first hop and the second hop, and determining a failure of the second hop based on control retransmission data of a radio link corresponding to communications between the first hop and the second hop.

Further aspects can comprise triggering, by the network device, a route change at an adaptation layer upon detecting the request for the route change; establishing the new protocol stack corresponding to the third hop and populating the new protocol stack with the data can be performed by a logic system.

Figure 7:
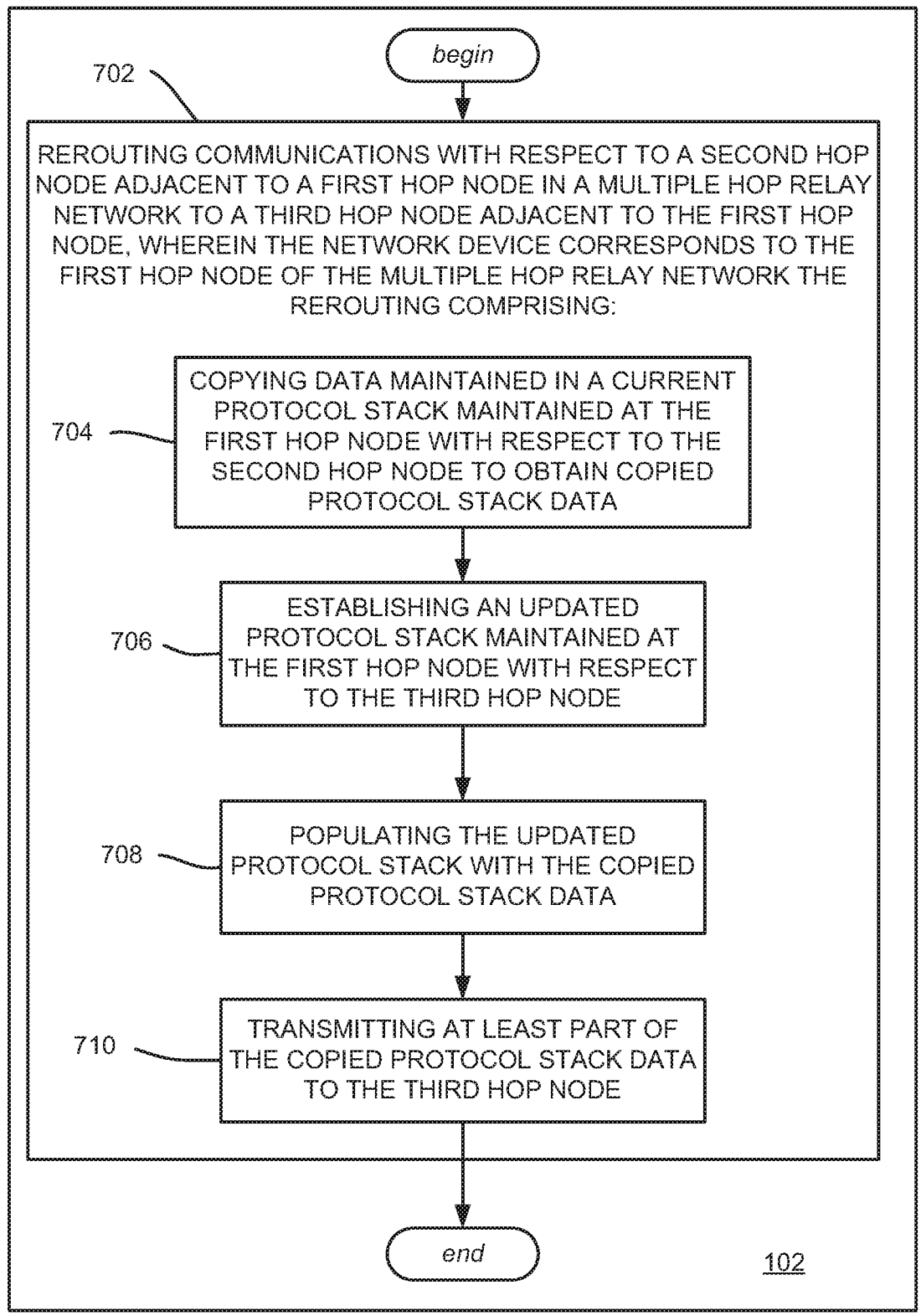
FIG. 7 illustrates a block diagram of a network device's example operations with respect to lossless data delivery in an IAB network with a dynamic route change, in accordance with various aspects and implementations of the subject disclosure.

FIG. 7 summarizes example operations of a network device, e.g., having a processor and a memory that stores executable instructions that, when executed by the processor, facilitate performance of such operations. Operation 702 represents rerouting communications with respect to a second hop node adjacent to a first hop node in a multiple hop relay network to a third hop node adjacent to the first hop node, wherein the network device corresponds to the first hop node of the multiple hop relay network. The rerouting can comprise copying (operation 704) data maintained in a current protocol stack maintained at the first hop node with respect to the second hop node to obtain copied protocol stack data and establishing (operation 706) an updated protocol stack maintained at the first hop node with respect to the third hop node. The rerouting can further comprise populating (operation 708) the updated protocol stack with the copied protocol stack data; and transmitting (operation 710) at least part of the copied protocol stack data to the third hop node.

The copied protocol stack data can comprise unacknowledged and unsent PDCP PDU data. Transmitting at least the part of the copied protocol stack data to the third hop node can comprise transmitting the unacknowledged and unsent PDCP PDU data to the third hop node before transmitting any new data that is received from an incoming link to the third hop node.

The network device corresponding to the first hop node can comprise a serving node between adjacent user equipment, and the second hop node and the third hop node. An adaptation layer can be part of the current protocol stack, and logic associated with the adaptation layer can perform the establishing the updated protocol stack maintained at the first hop node with respect to the third hop node, and the populating the updated protocol stack with the copied protocol stack data; the logic associated with the adaptation layer can further perform a resetting of at least a radio link control layer of the current protocol stack after the copying the data maintained in the radio link control layer of the current protocol stack.

Figure 8:
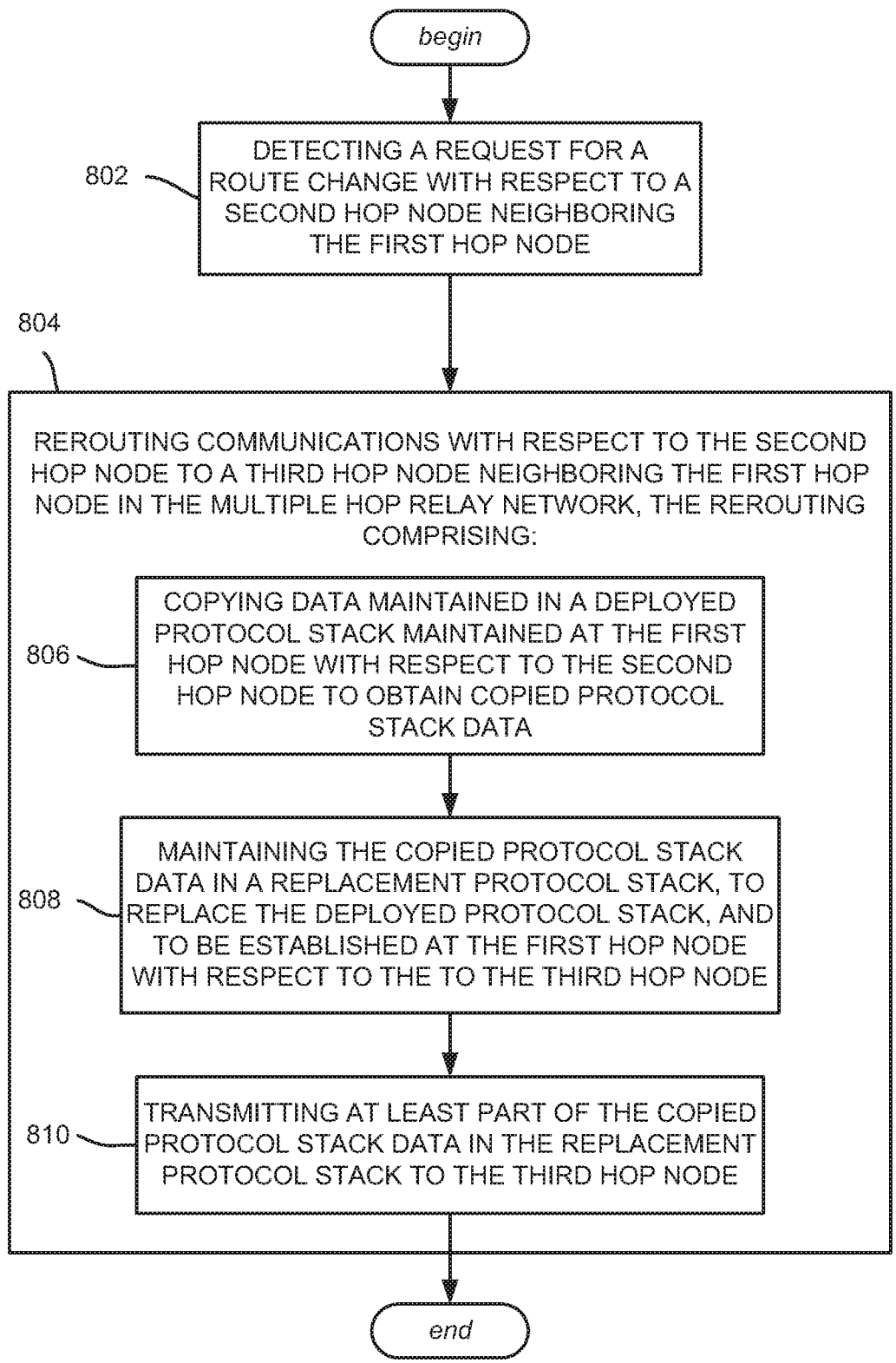
FIG. 8 illustrates an example flow diagram of network device operations with respect to lossless data delivery in an IAB network with a dynamic route change, in accordance with various aspects and implementations of the subject disclosure.

FIG. 8 shows other example operations, such as corresponding to a machine-readable storage medium, comprising executable instructions that, when executed by a processor of a network device of a first hop node in a multiple hop relay network, facilitate performance of the operations. Operation 802 represents detecting a request for a route change with respect to a second hop node neighboring the first hop node. Operation 804 represents rerouting communications with respect to the second hop node to a third hop node neighboring the first hop node in the multiple hop relay network. The rerouting can comprise copying (operation 806) data maintained in a deployed protocol stack maintained at the first hop node with respect to the second hop node to obtain copied protocol stack data, maintaining (operation 808) the copied protocol stack data in a replacement protocol stack, to replace the deployed protocol stack, and to be established at the first hop node with respect to the to the third hop node, and transmitting (operation 810) at least part of the copied protocol stack data in the replacement protocol stack to the third hop node.

Copying the data maintained in the deployed protocol stack can comprise copying the data from a first radio link control layer of the deployed protocol stack, and maintaining the copied protocol stack data in the replacement protocol stack can comprise populating a second radio link control layer of the replacement protocol stack.

The copied protocol stack data can comprise unacknowledged and unsent PDCP PDU data, and transmitting at least the part of the copied protocol stack data to the third hop node can comprise transmitting the unacknowledged and unsent PDCP PDU data to the third hop node before transmitting any further data that is received from an incoming link to the third hop node.

Detecting the request for the route change can comprise monitoring radio link control retransmission data corresponding to communications between the first hop node and the second hop node, and determining the request for the route change based on a radio link control retransmission rate corresponding to the radio link control retransmission data.

Further operations can comprise resetting a radio link control layer of the deployed protocol stack after the copying the data maintained in the deployed protocol stack.

As can be seen, the technology described herein facilitates the lossless delivery of data in an IAB network when there are route changes during an active data transaction. The technology allows the IAB node to perform data recovery internal to itself, without needing any external signaling to other nodes. This is very efficient, which makes the data recovery very fast and without the risk of further loss due to exchange of data packets on additional links.

Figure 9:
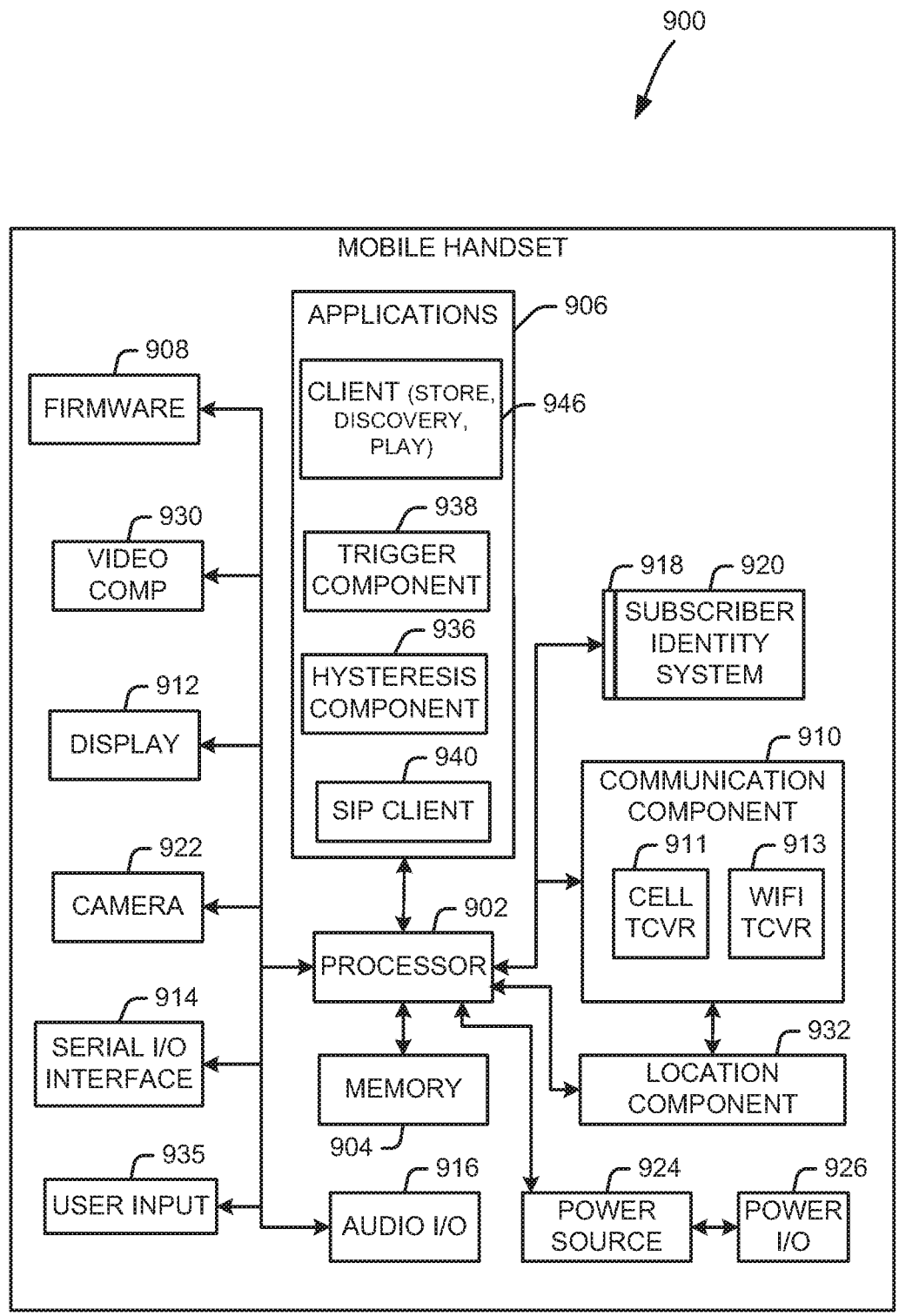
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
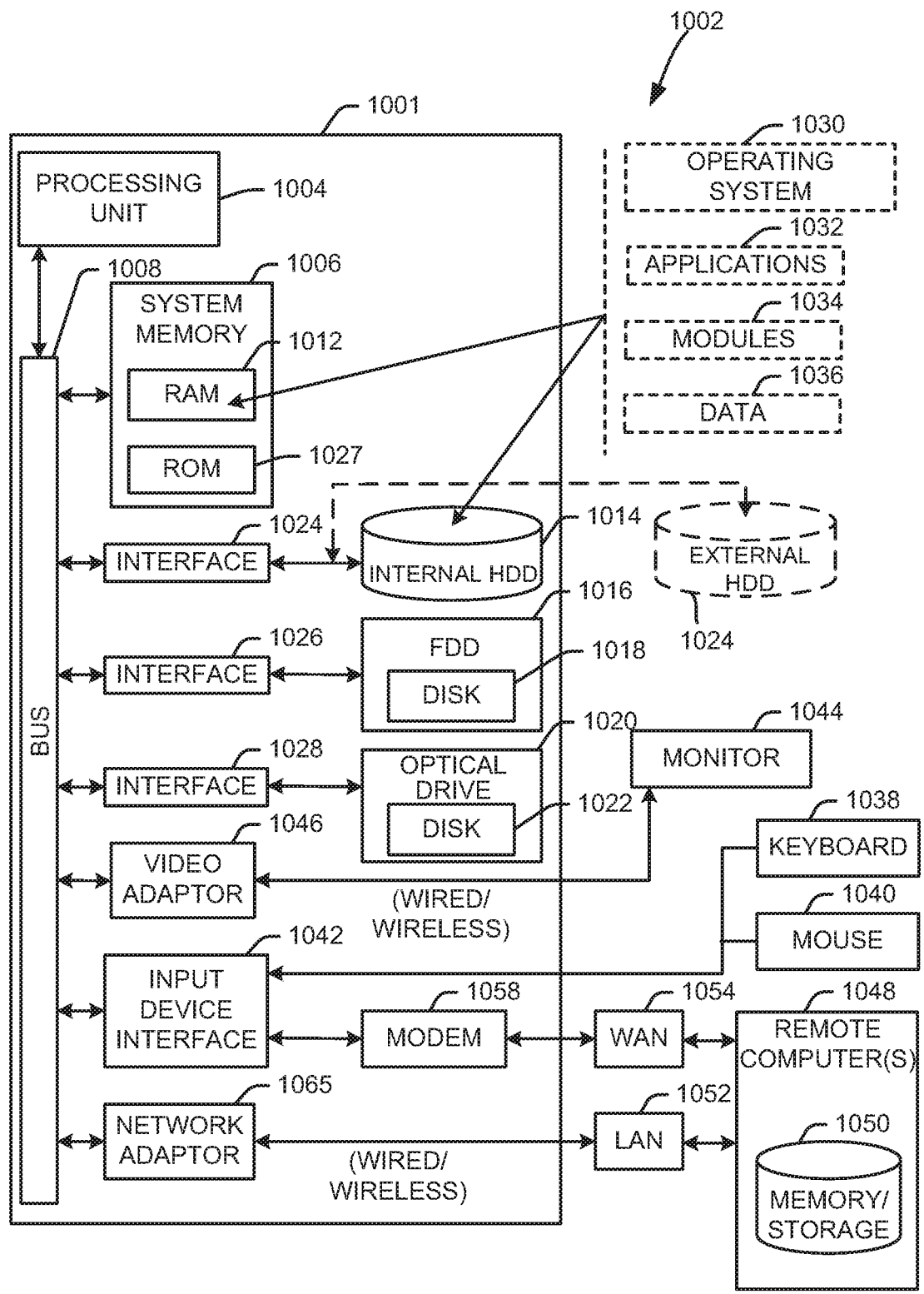
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 1020, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising,
    detecting, by network equipment comprising a processor in a first hop of a multiple hop relay network, a request for a route change with respect to a second hop adjacent to the first hop;
    copying, by the network equipment, data maintained in an existing protocol stack at the first hop, wherein the data corresponds to communication information with respect to the second hop, and comprises unacknowledged and unsent packet data convergence protocol protocol data unit (PDCP PDU) data;

selecting, by the network equipment, a third hop adjacent to the first hop as a replacement hop for the second hop;

establishing, by the network equipment, a new protocol stack, different than the existing protocol stack, corresponding to the third hop;

populating, by the network equipment, the new protocol stack with the data corresponding to the communication information with respect to the second hop; and communicating, by the network equipment, with the third hop to facilitate the route change, wherein the communicating comprises transmitting the unacknowledged and unsent PDCP PDU data to the third hop before transmitting any new data that is received from an incoming link to the third hop.

2. The method of claim 1, wherein copying the data maintained in the existing protocol stack comprises copying the data from a first radio link control layer of the existing protocol stack, and wherein populating the new protocol stack with the data comprises populating a second radio link control layer of the new protocol stack.

3. The method of claim 2, further comprising resetting, by the network equipment, the first radio link control layer of the existing protocol stack after copying the data maintained in the first radio link control layer of the existing protocol stack.

4. The method of claim 1, wherein copying the data maintained in the existing protocol stack comprises copying the data from a first radio link control layer of the existing protocol stack, and wherein populating the new protocol stack comprises populating a second radio link control layer of the new protocol stack with a copy of the data.

5. The method of claim 1, wherein detecting the request for the route change comprises determining a deterioration of a radio link between the first hop and the second hop.

6. The method of claim 1, wherein detecting the request for the route change comprises monitoring control retransmission data of a radio link corresponding to communications between the first hop and the second hop, and determining a deterioration of the radio link when the control retransmission data has reached a threshold value.

7. The method of claim 1, wherein detecting the request for the route change comprises monitoring radio link control retransmission data corresponding to communications between the first hop and the second hop, and determining a failure of the second hop based on control retransmission data of a radio link corresponding to communications between the first hop and the second hop.

8. The method of claim 1 further comprising, triggering, by the network equipment, the route change at an adaptation layer upon detecting the request for the route change, and wherein establishing the new protocol stack corresponding to the third hop and populating the new protocol stack with the data is performed by a logic system corresponding to the adaptation layer.

9. Network equipment, comprising:
a processor; and
a memory that stores executable instructions that, when executed by the processor, facilitate performance of operations, the operations comprising:
rerouting communications with respect to a second hop node adjacent to a first hop node in a multiple hop relay network to a third hop node adjacent to the first hop node, wherein the network equipment corresponds to the first hop node of the multiple hop relay network, the rerouting comprising:
copying data maintained in a current protocol stack maintained at the first hop node with respect to the second hop node to obtain copied protocol stack data, wherein the copied protocol stack data comprises unacknowledged and unsent packet data convergence protocol protocol data unit (PDCP PDU) data;
establishing an updated protocol stack maintained at the first hop node with respect to the third hop node;
populating the updated protocol stack with the copied protocol stack data; and
transmitting at least part of the copied protocol stack data to the third hop node, wherein the transmitting comprises transmitting the unacknowledged and unsent PDCP PDU data to the third hop node before transmitting any new data that is received via an incoming link to the third hop node.

10. The network equipment of claim 9, wherein the network equipment corresponding to the first hop node comprises a serving node between adjacent user equipment, and the second hop node and the third hop node.

11. The network equipment of claim 9, further comprising an adaptation layer of the current protocol stack,
wherein logic associated with the adaptation layer performs the establishing of the updated protocol stack maintained at the first hop node with respect to the third hop node, and the populating of the updated protocol stack with the copied protocol stack data, and
wherein the logic associated with the adaptation layer further performs a resetting of at least a radio link control layer of the current protocol stack after the copying of the data maintained in the radio link control layer of the current protocol stack.

12. A non-transitory machine-readable medium, comprising executable instructions that, when executed by a processor of a network device of a first hop node in a multiple hop relay network, facilitate performance of operations, the operations comprising:
detecting a request for a route change with respect to a second hop node neighboring the first hop node; and
rerouting communications with respect to the second hop node to a third hop node neighboring the first hop node in the multiple hop relay network, the rerouting comprising:
copying data maintained in a deployed protocol stack maintained at the first hop node with respect to the second hop node to obtain copied protocol stack data, wherein the copied protocol stack data comprises unacknowledged and unsent packet data convergence protocol protocol data unit (PDCP PDU) data;
maintaining the copied protocol stack data in a replacement protocol stack, to replace the deployed protocol stack, and to be established at the first hop node with respect to the to the third hop node; and
transmitting at least part of the copied protocol stack data in the replacement protocol stack to the third hop node, wherein the transmitting comprises transmitting the unacknowledged and unsent PDCP PDU data to the third hop node before transmitting any new data that is received from an incoming link to the third hop node.

13. The non-transitory machine-readable medium of claim 12, wherein copying the data maintained in the deployed protocol stack comprises copying the data from a first radio link control layer of the deployed protocol stack, and wherein maintaining the copied protocol stack data in the replacement protocol stack comprises populating a second radio link control layer of the replacement protocol stack.

14. The non-transitory machine-readable medium of claim 12, wherein detecting the request for the route change comprises monitoring radio link control retransmission data corresponding to communications between the first hop node and the second hop node, and determining the request for the route change based on a radio link control retransmission rate corresponding to the radio link control retransmission data.

15. The non-transitory machine-readable medium of claim 12, wherein the operations further comprise, resetting a radio link control layer of the deployed protocol stack after copying the data maintained in the deployed protocol stack.

16. The network equipment of claim 9, wherein copying the data maintained in the current protocol stack comprises copying the data from a first radio link control layer of the current protocol stack, and wherein populating the updated protocol stack with the data comprises populating a second radio link control layer of the updated protocol stack.

17. The network equipment of claim 9, wherein the operations further comprise detecting a request for a route change.

18. The network equipment of claim 17, wherein detecting the request for the route change comprises determining a deterioration of a radio link between the first hop node and the second hop node.

19. The network equipment of claim 17, wherein detecting the request for the route change comprises monitoring control retransmission data of a radio link corresponding to communications between the first hop node and the second hop node, and determining a deterioration of the radio link when the control retransmission data has reached a threshold value.

20. The network equipment of claim 17, wherein detecting the request for the route change comprises monitoring radio link control retransmission data corresponding to communications between the first hop node and the second hop node, and determining a failure of the second hop node based on control retransmission data of a radio link corresponding to communications between the first hop node and the second hop node.

* * * * *